United States Patent
Takigawa et al.

(10) Patent No.: US 8,390,768 B2
(45) Date of Patent: Mar. 5, 2013

(54) VERTICALLY ALIGNED LIQUID CRYSTAL DISPLAY DEVICE

(75) Inventors: Mitsuru Takigawa, Yao (JP); Mitsuo Moriya, Yao (JP); Naohiko Nakagawa, Yao (JP)

(73) Assignee: Hosiden Corporation, Yao-Shi (JP)

( * ) Notice: Subject to any disclaimer, the term of this patent is extended or adjusted under 35 U.S.C. 154(b) by 245 days.

(21) Appl. No.: 13/057,590

(22) PCT Filed: Feb. 9, 2009

(86) PCT No.: PCT/JP2009/052152
§ 371 (c)(1),
(2), (4) Date: Feb. 4, 2011

(87) PCT Pub. No.: WO2010/016284
PCT Pub. Date: Feb. 11, 2010

(65) Prior Publication Data
US 2011/0134375 A1   Jun. 9, 2011

(30) Foreign Application Priority Data

Aug. 6, 2008   (JP) ................................. 2008-203129

(51) Int. Cl.
*G02F 1/1335* (2006.01)
(52) U.S. Cl. ........... 349/96; 349/123; 349/117; 349/118
(58) Field of Classification Search .................... 349/96, 349/123, 128, 129, 130, 132, 134, 117, 118
See application file for complete search history.

(56) References Cited

U.S. PATENT DOCUMENTS

| | | | |
|---|---|---|---|
| 6,281,956 | B1 | 8/2001 | Ohmuro et al. |
| 7,777,844 | B2 * | 8/2010 | Oka et al. ...................... 349/114 |
| 2004/0119924 | A1 * | 6/2004 | Takeda et al. .................. 349/129 |
| 2008/0030655 | A1 | 2/2008 | Sugiyama et al. |
| 2008/0079878 | A1 | 4/2008 | Sugiyama et al. |
| 2011/0134375 | A1 * | 6/2011 | Takigawa et al. ................ 349/96 |

FOREIGN PATENT DOCUMENTS

| | | |
|---|---|---|
| JP | 10-153802 | 6/1998 |
| JP | 2007-304155 | 11/2007 |
| JP | 2008-116489 | 5/2008 |

* cited by examiner

*Primary Examiner* — Brian Healy
(74) *Attorney, Agent, or Firm* — Rankin, Hill & Clark LLP

(57) ABSTRACT

A vertically aligned liquid crystal display device is provided in which the phase difference value is increased be-yond a usual range, whereby the ON transmittance in high duty driving is increased to improve the contrast and the viewing angle. In the vertically aligned liquid crystal display device, the phase difference value in the thickness direction of the liquid crystal layer 8 is set in a range of from 500 nm to 1,600 nm, and a first phase difference plate 13 is inserted between the first and second polarizing plates 9, 10 in which the absorption axes 9a and 10a per-pendicularly intersect with each other. The first phase difference plate 13 is a uniaxial phase difference plate which has a negative refractive index anisotropy, in which the phase difference value in the thickness direction is set in a range of from 220 nm to 1,320 nm, and which has the optical axis perpendicular to first and second glass substrates 4,5 between which a liquid crystal layer 8 is interposed.

3 Claims, 7 Drawing Sheets

INCIDENT LIGHT

Fig. 3
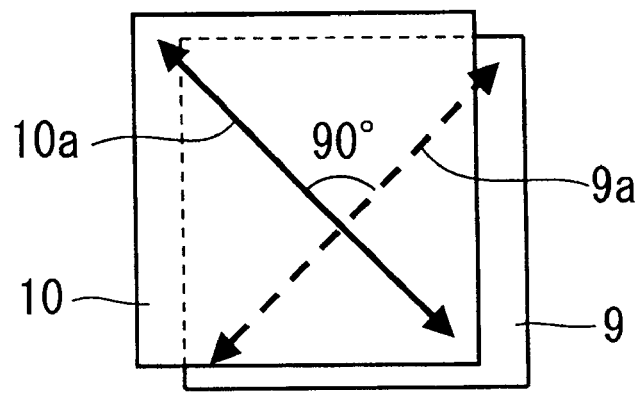
Fig. 4
(a)
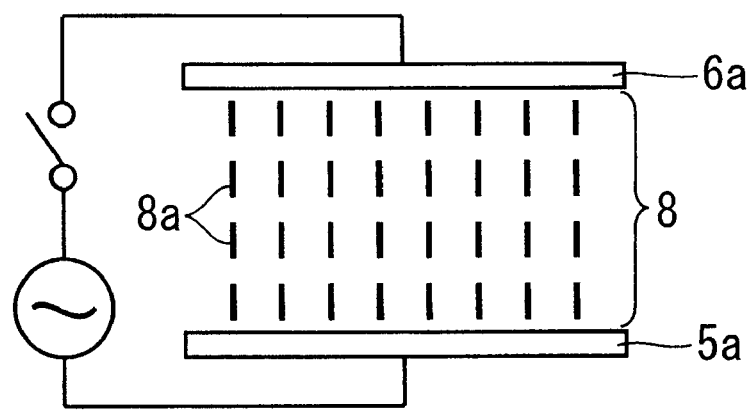
(b)
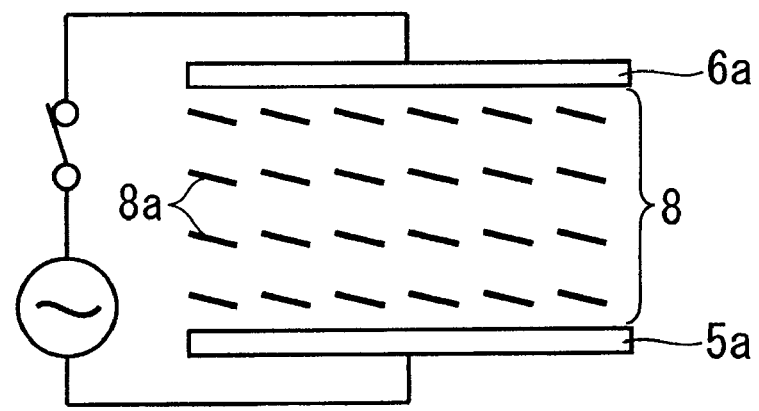

Fig. 8
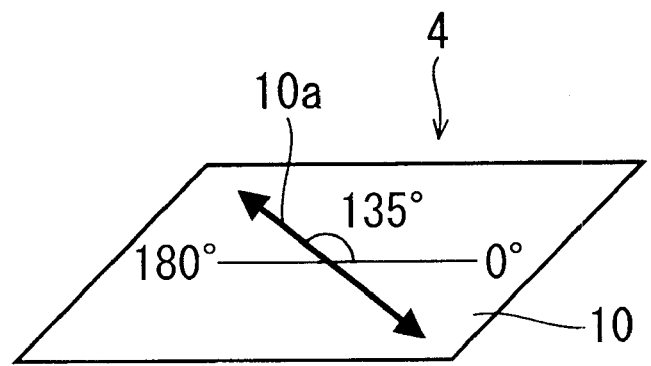
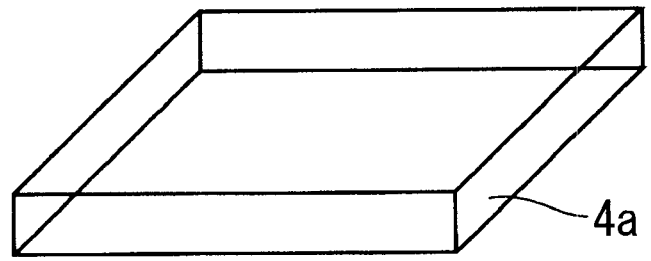
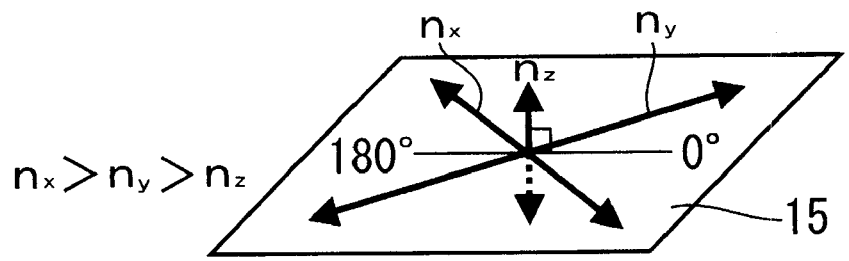
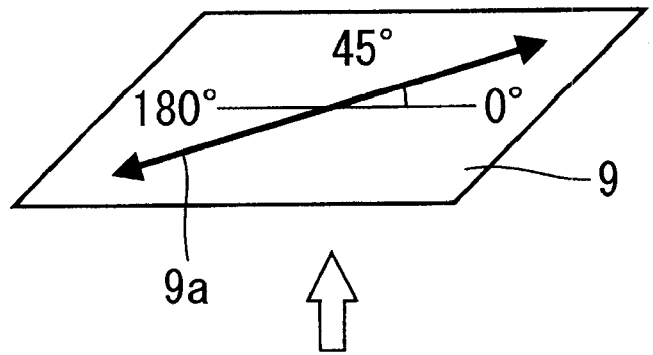
INCIDENT LIGHT

Fig. 9
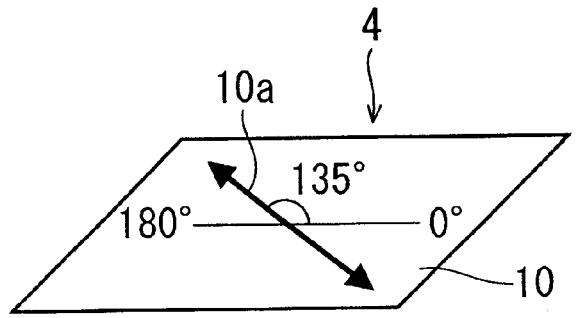
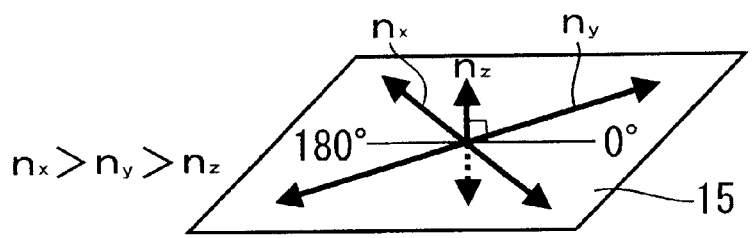
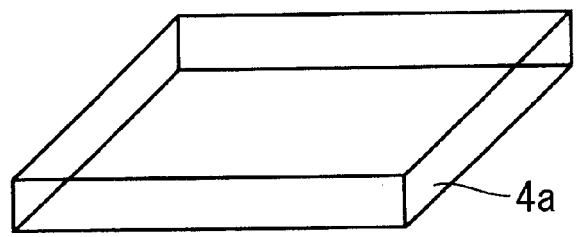
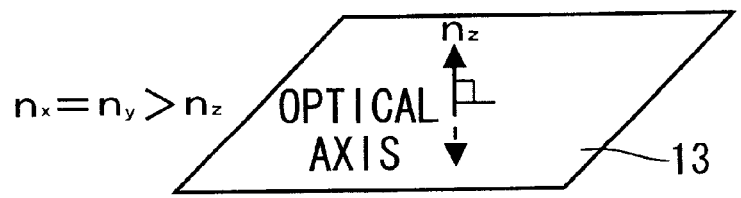
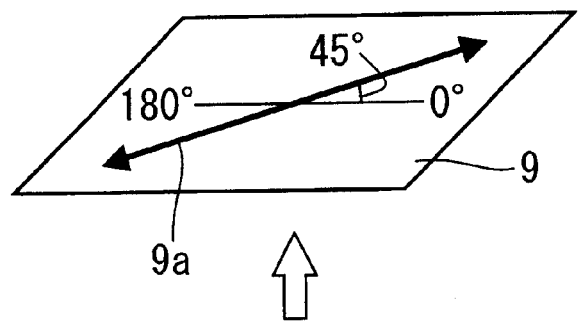
INCIDENT LIGHT

VERTICALLY ALIGNED LIQUID CRYSTAL DISPLAY DEVICE

TECHNICAL FIELD

The present invention relates to a vertically aligned liquid crystal display device which performs simple-matrix driving (duty driving).

BACKGROUND ART

In order to increase the capacity and definition of a vertically aligned liquid crystal display device by simple-matrix driving, high duty driving must be performed. As a prior art example of such a vertically aligned liquid crystal display device, Patent Literature 1 discloses a vertical alignment liquid crystal display element which performs a displaying operation by the time-division driving at a large duty ratio.
Patent Literature 1: Japanese Patent Application Laying-Open No. 10-197858

Problems to be Solved by the Invention

When a vertically aligned liquid crystal display device is driven at a high duty ratio, however, the ON transmittance is lowered. Therefore, the display becomes dark, and the contrast is lowered.

By contrast, when the phase difference value in the thickness direction of a liquid crystal layer is increased, the ON transmittance is raised, but the viewing angle is narrowed because, in the vertical alignment type, the bi-refringence change of the liquid crystal layer due to inclination is large.

Therefore, it is an object of the invention to provide a vertically aligned liquid crystal display device in which the phase difference value in the thickness direction of a liquid crystal layer is increased beyond a usual range, whereby the ON transmittance in high duty driving is increased to improve the contrast and the viewing angle.

Characteristics requested in a vertically aligned liquid crystal display device include a high contrast, a high-speed responsibility, and a wide viewing angle. It is the that the phase difference value in the thickness direction of a liquid crystal layer (liquid crystal cell) is preferably in a range of from 80 nm to 400 nm. It is generally known that, when a high contrast and a high-speed responsibility are further considered, the adequate region is more narrowed, and the target value is 240 to 280 nm.

Means for Solving the Problems

In the invention, as set forth in claim 1, the above-discussed problems are solved by a vertically aligned liquid crystal display device in which a liquid crystal layer is interposed between a first glass substrate which is transparent, and in which, among first and second transparent electrodes that are opposed to each other across a gap, the first transparent electrodes are disposed, and a second glass substrate which is transparent, and in which the second transparent electrodes are disposed, the liquid crystal layer being configured by liquid crystal which has a negative dielectric constant anisotropy, and in which alignment of liquid crystal molecules is substantially perpendicular to the first and second glass substrates, the alignment of the liquid crystal molecules being made substantially parallel to the first and second glass substrates when a voltage is applied between the first and second transparent electrodes, a first polarizing plate which has an absorption axis extending in a predetermined direction is placed on a side of the first glass substrate opposite to a side that is contacted with the liquid crystal layer, and a second polarizing plate which has an absorption axis extending in a direction perpendicular to the absorption axis of the first polarizing plate is placed on a side of the second glass substrate opposite to a side that is contacted with the liquid crystal layer, wherein, when a refractive index in a long axis direction of the liquid crystal molecules is indicated as $n_e$, a refractive index in a short axis direction is indicated as $n_o$, $n_e - n_o = \Delta n$, and a thickness of the liquid crystal layer is indicated as d, a phase difference value which is given by $\Delta n \cdot d$, and which is in a thickness direction of the liquid crystal layer is set in a range of from 500 nm to 1,600 nm, a first phase difference plate is inserted between the first and second polarizing plates, and the first phase difference plate is a uniaxial phase difference plate which has a negative refractive index anisotropy that, when a refractive index in a slow axis direction showing a maximum refractive index in a plane is indicated as $n_x$, a refractive index in a fast axis direction perpendicular to the slow axis direction in a plane is indicated as $n_y$, and a refractive index in a thickness direction is indicated as $n_z$, shows $n_x = n_y > n_z$, a phase difference value in the thickness direction that, when a thickness is indicated as d1, is given by $|(n_x+n_y)/2 - n_z| \cdot d1$ being set in a range of from 220 nm to 1,320 nm, the first phase difference plate having an optical axis perpendicular to the first and second glass substrates.

As set forth in claim 2, the problems are solved by a vertically aligned liquid crystal display device according to claim 1, wherein a second phase difference plate is additionally inserted between the first and second polarizing plates, and the second phase difference plate is a uniaxial phase difference plate which has a positive refractive index anisotropy that shows $n_x > n_y = n_z$, a phase difference value in a plane that, when a thickness is indicated as d2, is given by $|(n_x-n_y)| \cdot d2$ being set in a range of from 1 nm to 100 nm, the second phase difference plate having an optical axis parallel to the first and second glass substrates.

As set forth in claim 3, the problems are solved by a vertically aligned liquid crystal display device according to claim 2, wherein, in place of the first and second phase difference plates, a third phase difference plate is inserted between the first and second polarizing plates, and the third phase difference plate is a biaxial phase difference plate which has a refractive index anisotropy that shows $n_x > n_y > n_z$, a phase difference value in a plane that, when a thickness is indicated as d3, is given by $|(n_x-n_y)| \cdot d3$ being set in a range of from 1 nm to 100 nm, a phase difference value in the thickness direction that is given by $|(n_x+n_y)/2 - n_z| \cdot d3$ being set in a range of from 220 nm to 1,320 nm, the third phase difference plate having an in-plane slow axis parallel to the first and second glass substrates.

Effects of the Invention

According to the vertically aligned liquid crystal display devices set forth in claims 1, 2, and 3 of the invention, the birefringence of the liquid crystal layer in which the phase difference value in the thickness direction is increased beyond a usual range (from 80 nm to 400 nm) can be compensated by the phase difference plate, and hence the ON transmittance in high duty driving can be increased, so that the contrast and the viewing angle can be improved.

BRIEF DESCRIPTION OF THE DRAWINGS

FIG. 3 is a plan view showing polarizing plates of the embodiments of the VA liquid crystal display devices set forth in claims 1 to 3 of the invention.

FIG. 4(a) is a diagram showing liquid crystal alignment in an undriven state of the embodiments of the VA liquid crystal display devices set forth in claims 1 to 3 of the invention, and FIG. 4(b) is a diagram showing liquid crystal alignment in a driven state of the embodiments of the VA liquid crystal display devices set forth in claims 1 to 3 of the invention.

FIG. 8 is a diagram showing the configuration of the embodiment of the VA liquid crystal display device set forth in claim 3 of the invention.

FIG. 9 is a diagram showing the configuration of an embodiment of a VA liquid crystal display device of a modification of the invention.

Figure 1:
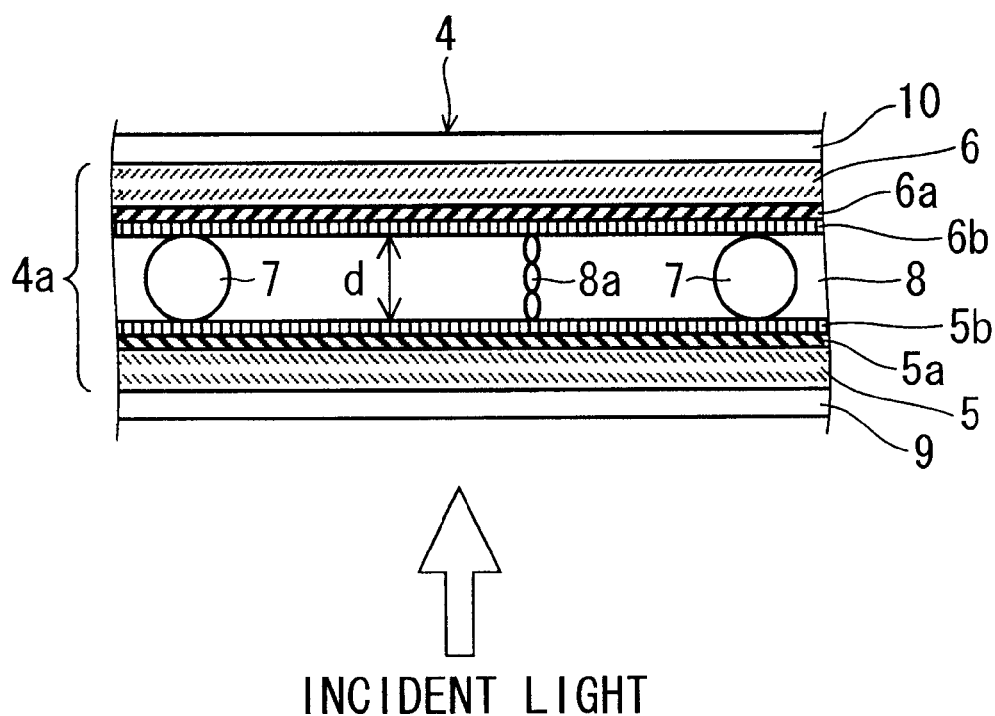
FIG. 1 is a sectional view showing a basic configuration of embodiments of the VA liquid crystal display devices set forth in claims 1 to 3 of the invention.

DESCRIPTION OF REFERENCE NUMERALS 1, 2, 3 VA liquid crystal display device
4 liquid crystal panel
4a panel body
5 first glass substrate
5a first transparent electrode
6 second glass substrate
6a second transparent electrode
8 liquid crystal layer
8a liquid crystal molecule
9 first polarizing plate
9a absorption axis
10 second polarizing plate
10a absorption axis
13 first phase difference plate
14 second phase difference plate
15 third phase difference plate Best Mode for Carrying Out the Invention Hereinafter, embodiments of the vertically aligned liquid crystal display devices (hereinafter, referred to as "VA liquid crystal display devices") set forth in claims 1 to 3 of the invention will be described with reference to the drawings.

Figure 2:
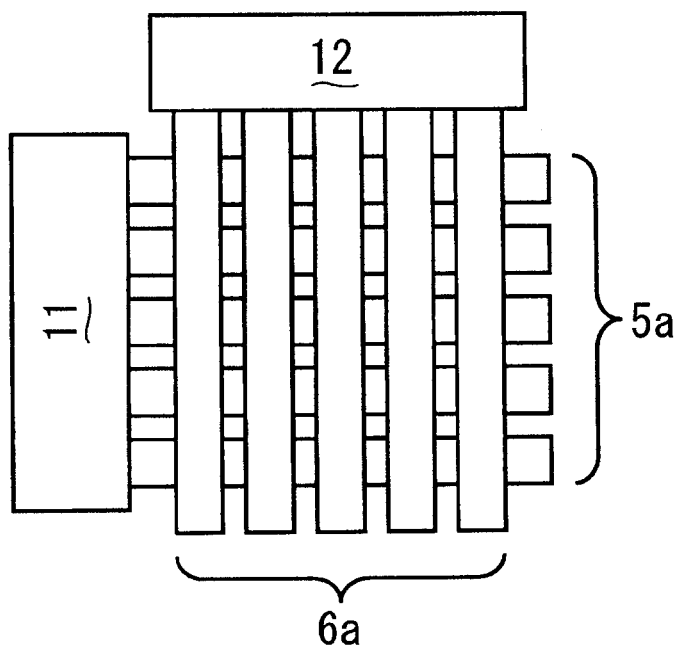
FIG. 2 is a plan view showing an electrode structure of the embodiments of the VA liquid crystal display devices set forth in claims 1 to 3 of the invention.

FIG. 1 is a sectional view showing a basic configuration of the embodiments of the VA liquid crystal display devices set forth in claims 1 to 3 of the invention, FIG. 2 is a plan view showing an electrode structure of the embodiments of the VA liquid crystal display devices set forth in claims 1 to 3 of the invention, FIG. 3 is a plan view showing polarizing plates of the embodiments of the VA liquid crystal display devices set forth in claims 1 to 3 of the invention, FIG. 4(a) is a diagram showing liquid crystal alignment in an undriven state of the embodiments of the VA liquid crystal display devices set forth in claims 1 to 3 of the invention, and FIG. 4(b) is a diagram showing liquid crystal alignment in a driven state of the embodiments of the VA liquid crystal display devices set forth in claims 1 to 3 of the invention.

The VA liquid crystal display devices 1, 2, 3 (1: the VA liquid crystal display device of the embodiment of the VA liquid crystal display device set forth in claim 1 of the invention, 2: the VA liquid crystal display device of the embodiment of the VA liquid crystal display device set forth in claim 2 of the invention, and 3: the VA liquid crystal display device of the embodiment of the VA liquid crystal display device set forth in claim 3 of the invention) include a liquid crystal panel 4, and display an image by using the liquid crystal panel 4.

As shown in FIG. 1, in the liquid crystal panel 4, a first glass substrate 5 in which first transparent electrodes 5a that are transparent are formed on the whole of one substrate surface, a first alignment film 5b is formed on the first transparent electrodes 5a, and a rubbing process is applied to the first alignment film 5b, and a second transparent glass substrate 6 in which a second transparent electrodes 6a that are transparent are similarly formed on the whole of one substrate surface, a second alignment film 6b is formed on the second transparent electrodes 6a, and a rubbing process is applied to the second alignment film 6b are bonded to each other along a direction in which the first alignment film 5b and the second alignment film 6b are opposed to each other, while polymer balls 7 are used as spacer members, and the periphery is sealed by a sealing member (not shown), thereby forming a panel body 4a.

In the panel body 4a, the gap (cell gap) between the first and second glass substrate 5 and 6 is filled with liquid crystal (nematic liquid crystal) having a negative dielectric constant anisotropy, by the vacuum filling method, the dripping method, or the like, thereby forming a liquid crystal layer 8. In the thus formed liquid crystal layer 8, the thickness d of the liquid crystal layer 8 is set by the diameter of the polymer balls 7 which are used as spacer members.

In the outside of the panel body 4a, a first polarizing plate 9 is bonded to the substrate surface (panel back face) opposite to the side of the first glass substrate 5 which is contacted with the liquid crystal layer 8, and a second polarizing plate 10 is bonded to the substrate surface (panel front face) opposite to the side of the second glass substrate 6 which is contacted with the liquid crystal layer 8, thereby completing the liquid crystal panel 4.

As shown in FIG. 2, in the first and second transparent electrodes 5a and 6a, the first transparent electrodes 5a are formed in parallel to the horizontal direction (right and left direction of FIG. 2) of the first glass substrate 5, and function as scan electrodes connected to a scan driving circuit 11, and the second transparent electrode 6b are formed in parallel to the vertical direction (upper and lower direction) of the second glass substrate 6, and function as signal electrodes connected to a signal driving circuit 12. In the liquid crystal panel 5, each of intersections of the first and second transparent electrodes 5a and 6a which are formed in parallel to the horizontal and vertical directions is used as one pixel. In other words, in the liquid crystal panel 4, pixels are arranged in a lattice-like manner, the first and second transparent electrodes 5a and 6a which are extend in the horizontal and vertical directions are placed with respect to the pixels which are arranged in a lattice-like manner, and a voltage is applied while selecting required ones of the horizontal and vertical first and second transparent electrodes 5a and 6a. As a result, the liquid crystal layer 8 (liquid crystal cells) of the pixels at intersections of the selected horizontal and vertical first and second transparent electrodes 5a and 6a are driven. Namely, the liquid crystal panel 4 is driven by the simple-matrix method. However, the driving is performed by the time-division multiplex driving method because the number of pixels to be displayed is large.

As shown in FIG. 3, in the first and second polarizing plates 9 and 10, the first polarizing plate 9 has the absorption axis extending in the direction indicated by the arrow 9a, and the second polarizing plate 10 has the absorption axis extending in the direction indicated by the arrow 10a. Namely, the first polarizing plate 9 and the second polarizing plate 10 are placed so that the absorption axes 9a and 10a perpendicularly intersect with each other.

In the thus configured liquid crystal panel 4, in an undriven state where no voltage is applied between the first and second transparent electrodes 5a and 6a, as shown in FIG. 4(a), liquid crystal molecules 8a in the liquid crystal layer 8 (liquid crystal cells) interposed between the first and second transparent electrodes 5a and 6a are aligned substantially perpendicularly to the first and second glass substrate 5 and 6 by the function of the first and second alignment films 5b and 6b, so that the polarization state of light passing through the layer is little changed. Therefore, light which is transmitted through the first polarizing plate 9 on the incidence side (back side) of the liquid crystal panel 4 is incident with little change on the second polarizing plate 10 on the emission side (front side) of the liquid crystal panel 4 to be mostly absorbed thereby, with the result that a dark display (black display) is performed.

By contrast, in a driven state where the voltage is applied between the first and second transparent electrodes 5a and 6a, as shown in FIG. 4(b), the liquid crystal molecules 8a in the liquid crystal layer 8 interposed between the first and second transparent electrodes 5a and 6a are aligned substantially perpendicularly to the electric field, i.e., substantially parallel to the first and second glass substrate 5 and 6 by the negative dielectric constant anisotropy, so that the polarization state of light passing through the layer is changed. Therefore, light which is transmitted through the first polarizing plate 9 on the incidence side of the liquid crystal panel 4 is emitted from the liquid crystal layer 8 while the polarization state is changed. Therefore, the polarization component of the transmission axis which is perpendicular to the absorption axis 10 of the second polarizing plate 10 on the emission side of the liquid crystal panel 4 is increased, with the result that a bright display (white display) is performed.

As apparent from the above, each of the VA liquid crystal display devices 1, 2, 3 is a vertically aligned liquid crystal display device in which the liquid crystal layer 8 configured by the liquid crystal which has a negative dielectric constant anisotropy, and in which the alignment of the liquid crystal molecules 8a is substantially perpendicular to the first and second glass substrates 5 and 6, and, when a voltage is applied between the first and second transparent electrodes 5a and 6a, the alignment of the liquid crystal molecules 8a is substantially parallel to the first and second glass substrates 5 and 6 is interposed between the first glass substrate 5 which is transparent, and in which, among the first and second transparent electrodes 5a and 6a that are opposed to each other across the gap, the first transparent electrode 5a is disposed, and the second glass substrate 6 which is transparent, and in which the second transparent electrode 6a is disposed, the first polarizing plate 9 which has the absorption axis 9a extending in a predetermined direction is placed on the side of the first glass substrate 5 opposite to the side that is contacted with the liquid crystal layer 8, and the second polarizing plate 10 which has the absorption axis 10a extending in a direction perpendicular to the absorption axis 9a of the first polarizing plate 9 is placed on the side of the second glass substrate 6 opposite to the side that is contacted with the liquid crystal layer 8. The device performs simple-matrix driving (duty driving), and, in response to the requests of a large capacity and high definition, performs high duty driving.

Figure 5:
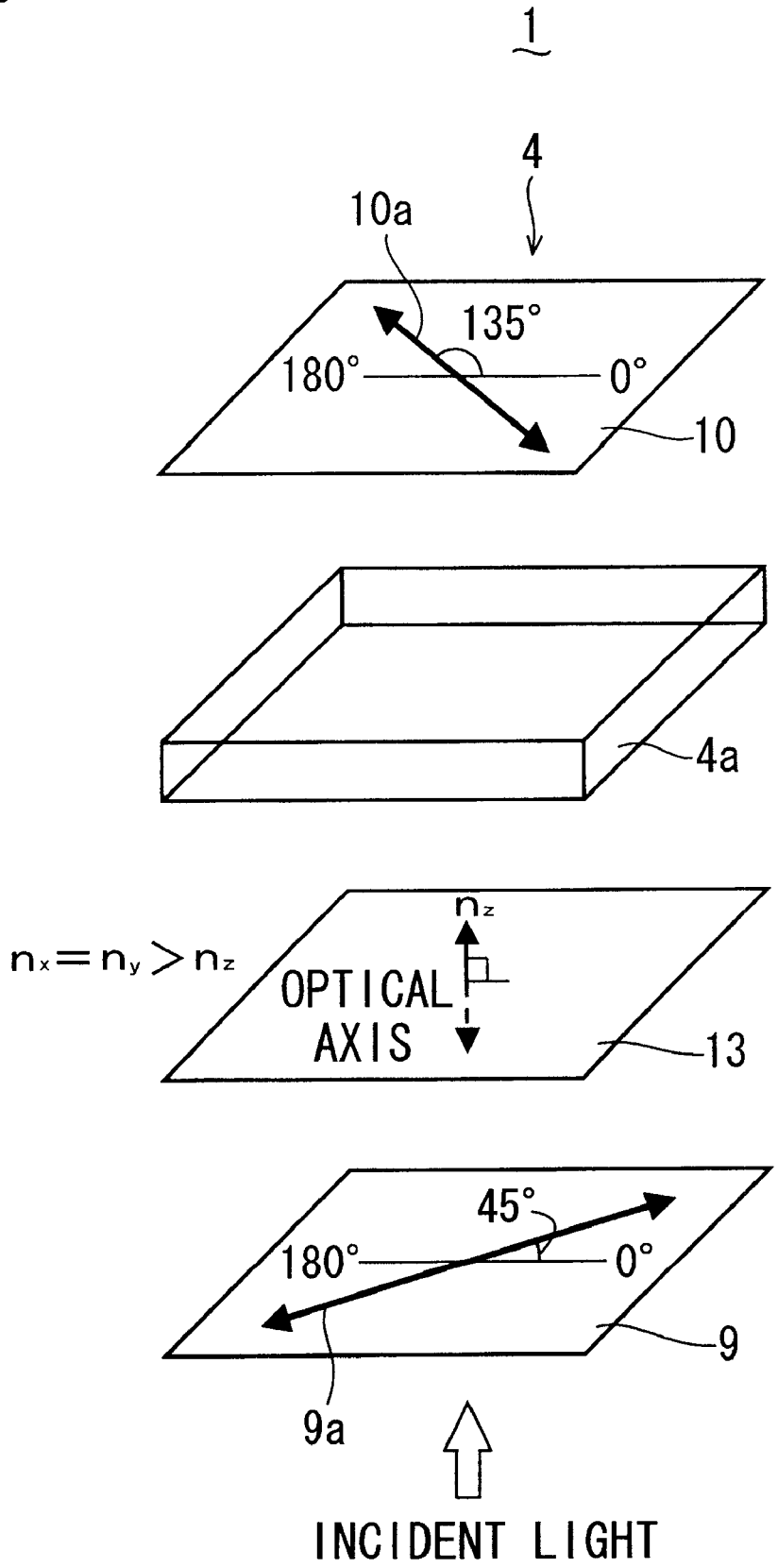
FIG. 5 is a diagram showing the configuration of the embodiment of the VA liquid crystal display device set forth in claim 1 of the invention.

FIG. 5 is a digram showing the configuration of the embodiment of the VA liquid crystal display device set forth in claim 1 of the invention.

In the VA liquid crystal display device 1 shown in FIG. 5, the phase difference value in the thickness direction of the liquid crystal layer 8 in the liquid crystal panel 4 is set to be large or beyond a usual range (80 nm to 400 nm). Namely, the phase difference value is set in a range of from 500 nm to 1,600 nm.

Here, the phase difference value in the thickness direction of the liquid crystal layer 8 is given by $\Delta n \cdot d$ where $\Delta n = n_e - n_o$, $n_e$ is the refractive index (refractive index of extraordinary light) in the long axis direction of the liquid crystal molecules 8a, $n_o$ is the refractive index (refractive index of ordinary light) in the short axis direction of the liquid crystal molecules 8a, and d is the thickness of the liquid crystal layer 8.

In the VA liquid crystal display device 1 shown in FIG. 5, a first phase difference plate 13 is inserted between the first and second polarizing plates 9 and 10 in the liquid crystal panel 4.

The first phase difference plate 13 is a uniaxial phase difference plate (negative C plate) which has a negative refractive index anisotropy that, when the refractive index in the slow axis direction showing the maximum refractive index in a plane is indicated as $n_x$, the refractive index in the fast axis direction perpendicular to the slow axis direction in a plane is indicated as $n_y$, and the refractive index in the thickness direction is indicated as $n_z$, shows $n_x = n_y > n_z$, in which the phase difference value in the thickness direction that, when the thickness is indicated as d1, is given by $|(n_x + n_y)/2 - n_z| \cdot d1$ is set in a range of from 220 nm to 1,320 nm, and which has the optical axis perpendicular to the first and second glass substrates, and compensates the birefringence of the liquid crystal layer 8.

Figure 6:
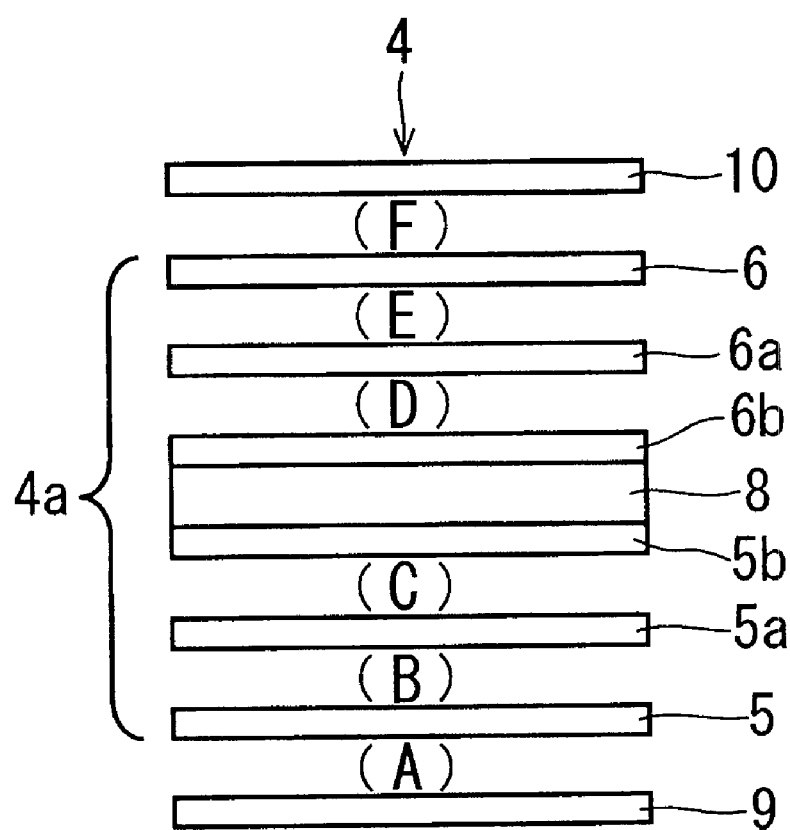
FIG. 6 is a schematic view showing phase difference plate insertion places in the embodiments of the VA liquid crystal display devices set forth in claims 1 to 3 of the invention.

FIG. 6 is a schematic view showing phase difference plate insertion places in the embodiments of the VA liquid crystal display devices set forth in claims 1 to 3 of the invention.

In FIGS. 6, (A), (B), (C), (D), (E), and (F) show the following phase difference plate insertion places in the liquid crystal panel 4:

(A): between the first glass substrate 5 and the first polarizing plate 9;
(B): between the first glass substrate 5 and the first transparent electrode 5a;
(C): between the first transparent electrode 5a and the first alignment film 5b;
(D): between the second transparent electrodes 6a and the second alignment film 6b;
(E): between the second glass substrate 6 and the second transparent electrodes 6a; and
(F): between the second glass substrate 6 and the second polarizing plate 10.

Namely, (A) to (C) are phase difference plate insertion places on the light incidence side of the liquid crystal layer 8, and (D) to (F) are phase difference plate insertion places on the light emission side of the liquid crystal layer 8. Furthermore, (A) and (F) are phase difference plate insertion places outside the panel body 4a, and (B) to (E) are phase difference plate insertion places inside the panel body 4a.

The VA liquid crystal display device 1 shown in FIG. 5 shows the configuration where the one first phase difference plate 13 is inserted into (A) in the liquid crystal panel 4, and the birefringence of the liquid crystal layer 8 is compensated. Also when the phase difference plate is inserted into any one of (B) to (F) in place of (A), it is possible to compensate the birefringence of the liquid crystal layer 8. Also when two first phase difference plates 13 are inserted into (A) and (F), (B)

and (E), or (C) and (D), it is possible to compensate the birefringence of the liquid crystal layer 8, but, in this case, the phase difference values in the thickness direction of the two first phase difference plates 13 are set so that their total is 220 nm to 1,320 nm.

Figure 7:
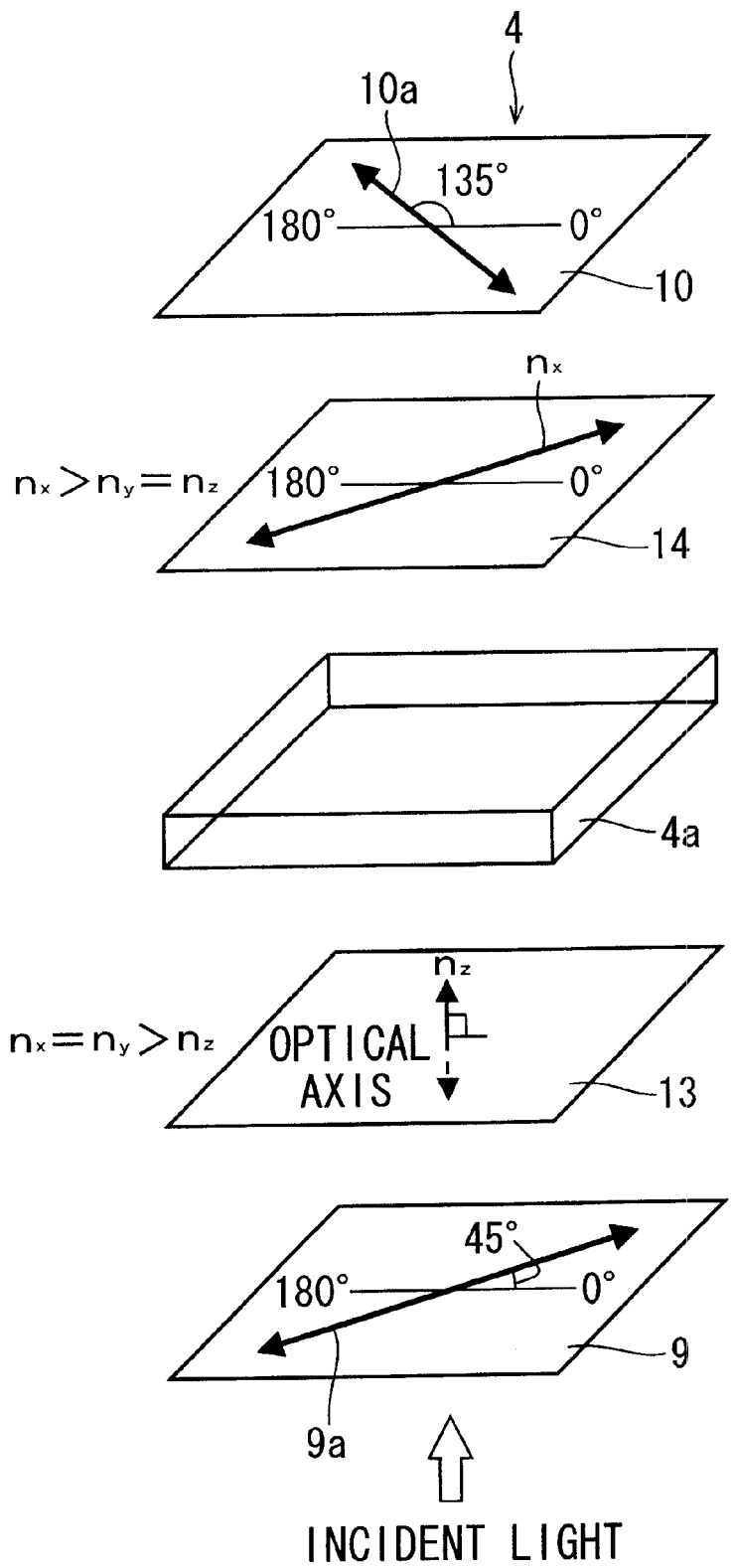
FIG. 7 is a diagram showing the configuration of the embodiment of the VA liquid crystal display device set forth in claim 2 of the invention.

Next, FIG. 7 is a diagram showing the configuration of the embodiment of the VA liquid crystal display device set forth in claim 2 of the invention.

In the VA liquid crystal display device 2 shown in FIG. 7, a second phase difference plate 14 is further additionally inserted between the first and second polarizing plates 9 and 10 in the liquid crystal panel 4 of the VA liquid crystal display device 1 shown in FIG. 5.

The second phase difference plate 14 is a uniaxial phase difference plate (positive a plate) which has a positive refractive index anisotropy that shows $n_x>n_y=n_z$, in which the phase difference value in a plane that, when the thickness is indicated as d2, is given by $|(n_x-n_y)|\cdot d2$ is set in a range of from 1 nm to 100 nm, and which has the optical axis parallel to the first and second glass substrates 5 and 6.

The VA liquid crystal display device 2 shown in FIG. 7 shows the configuration where the one first phase difference plate 13 is inserted into (A) in the liquid crystal panel 4, and the one second phase difference plate 14 is inserted into (F). Alternatively, the one first phase difference plate 13 may be inserted into (B), and the one second phase difference plate 14 may be inserted into (E), or the one first phase difference plate 13 is inserted into (C), and the one second phase difference plate 14 is inserted into (D). Alternatively, the one first phase difference plate 13 and the one second phase difference plate 14 may be inserted in a stacked state into any one (same insertion place) of (A) to (F), or two places of (A) and (F), (B) and (E), or (C) and (D) in a stacked state. In this case, the first phase difference plate 13 is placed outside the second phase difference plate 14, and the phase difference values of the two second phase difference plates 14 in a plane are set so that their total is 1 nm to 100 nm. The second phase difference plate 14 which is inserted into (A), (B), or (C) on the light incidence side of the liquid crystal layer 8 is placed so that the in-plane slow axis $n_x$ is perpendicular to the absorption axis 9a of the first polarizing plate 9 on the light incidence side of the liquid crystal layer 8, and the second phase difference plate 14 which is inserted into (D), (E), or (F) on the light emission side of the liquid crystal layer 8 is placed so that the in-plane slow axis $n_x$ is perpendicular to the absorption axis 10a of the second polarizing plate 10 on the light emission side of the liquid crystal layer 8.

FIG. 8 is a diagram showing the configuration of the embodiment of the VA liquid crystal display device set forth in claim 3 of the invention.

In the VA liquid crystal display device 3 shown in FIG. 8, in place of the first phase difference plate 13 and second phase difference plate 14 which are inserted into the liquid crystal panel 4 of the VA liquid crystal display device 2 shown in FIG. 7, a third phase difference plate 15 is inserted between the first and second polarizing plates 9 and 10 in the liquid crystal panel 4.

The third phase difference plate 15 is a biaxial phase difference plate which has a refractive index anisotropy that shows $n_x>n_y>n_z$, in which a phase difference value in a plane that, when the thickness is indicated as d3, is given by $|(n_x-n_y)|\cdot d3$ is set in a range of from 1 nm to 100 nm, and which has a phase difference value in the thickness direction that is given by $|(n_x+n_y)/2-n_z|\cdot d3$ is set in a range of from 220 nm to 1,320 nm, and which has an in-plane slow axis parallel to the first and second glass substrates 5 and 6.

The VA liquid crystal display device 3 shown in FIG. 8 shows the configuration where the one third phase difference plate 15 is inserted into (A) in the liquid crystal panel 4. Alternatively, the phase difference plate may be inserted into any one of (B) to (F) in place of (A), or two places of (A) and (F), (B) and (E), or (C) and (D). In this case, the phase difference values of two third phase difference plates 15 in a plane are set so that their total is 1 nm to 100 nm, and the phase difference values of two third phase difference plates 15 in the thickness direction are set so that their total is 220 nm to 1,320 nm. The third phase difference plate 15 which is inserted into (A), (B), or (C) on the light incidence side of the liquid crystal layer 8 is placed so that the in-plane slow axis $n_x$ is perpendicular to the absorption axis 9a of the first polarizing plate 9 on the light incidence side of the liquid crystal layer 8, and the third phase difference plate 15 which is inserted into (D), (E), or (F) on the light emission side of the liquid crystal layer 8 is placed so that the in-plane slow axis $n_x$ is perpendicular to the absorption axis 10a of the second polarizing plate 10 on the light emission side of the liquid crystal layer 8.

In FIGS. 5, 7, and 8, the straight line connecting 0° and −180° indicates the alignment direction of the liquid crystal molecules 8a.

When the VA liquid crystal display devices 1, 2, 3 were driven at a high duty ratio of 1/60, a viewing angle of 50° or more in each of right and left at a contrast ratio of 10:1 in the right and left direction, and 50° or more at a contrast ratio of 20:1 in the upper direction was realized. The results were confirmed by using a conoscope manufactured by AUTRONIC-MELCHERS GmbH.

In the VA liquid crystal display devices 1, 2, 3, as compared with the optical compensation of the liquid crystal panel 4 due to the use of the one or more first phase difference plates 13 in the VA liquid crystal display device 1, the combination of the two third phase difference plates 15 in the VA liquid crystal display device 3 exerts a higher compensation effect, and followed by that of the first phase difference plate 13 and the second phase difference plate 14 in the VA liquid crystal display device 2.

Alternatively, the first phase difference plate 13 and the third phase difference plate 15 may be combined with each other, and the combination can exert a compensation effect subsequent to the VA liquid crystal display device 3. FIG. 9 is a diagram showing the configuration of an embodiment of a VA liquid crystal display device of a modification (claim 1+claim 3) of the invention.

In the VA liquid crystal display device 40 shown in FIG. 9, the third phase difference plate 15 shown in FIG. 8 is further additionally inserted between the first and second polarizing plates 9 and 10 in the liquid crystal panel 4 of the VA liquid crystal display device 1 shown in FIG. 5, or, in place of the second phase difference plate 14 inserted into the liquid crystal panel 4 of the VA liquid crystal display device 2 shown in FIG. 7, the third phase difference plate 15 shown in FIG. 8 is inserted between the first and second polarizing plates 9 and 10 in the liquid crystal panel 4, or the first phase difference plate 13 shown in FIG. 5 is further additionally inserted between the first and second polarizing plates 9 and 10 in the liquid crystal panel 4 of the VA liquid crystal display device 3 shown in FIG. 8.

The VA liquid crystal display device 40 shown in FIG. 9 shows the configuration where the one first phase difference plate 13 is inserted into (A) in the liquid crystal panel 4, and the one third phase difference plate 15 is inserted into (F). The insertion places, directions of the slow axes, and phase difference values of the first and third phase difference plates 13 and 15 are adequately set in a similar manner as the VA liquid crystal display devices 1, 2, 3.

The invention claimed is:

1. A vertically aligned liquid crystal display device in which
a liquid crystal layer is interposed between a first glass substrate which is transparent, and in which, among first and second transparent electrodes that are opposed to each other across a gap, said first transparent electrodes are disposed, and a second glass substrate which is transparent, and in which said second transparent electrodes are disposed, said liquid crystal layer being configured by liquid crystal which has a negative dielectric constant anisotropy, and in which alignment of liquid crystal molecules is substantially perpendicular to said first and second glass substrates, the alignment of the liquid crystal molecules being made substantially parallel to said first and second glass substrates when a voltage is applied between said first and second transparent electrodes,
a first polarizing plate which has an absorption axis extending in a predetermined direction is placed on a side of said first glass substrate opposite to a side that is contacted with said liquid crystal layer, and a second polarizing plate which has an absorption axis extending in a direction perpendicular to the absorption axis of said first polarizing plate is placed on a side of said second glass substrate opposite to a side that is contacted with said liquid crystal layer, wherein,
when a refractive index in a long axis direction of the liquid crystal molecules is indicated as $n_e$, a refractive index in a short axis direction is indicated as $n_o$, $n_e - n_o = \Delta n$, and a thickness of said liquid crystal layer is indicated as d, a phase difference value which is given by $\Delta n \cdot d$, and which is in a thickness direction of said liquid crystal layer is set in a range of from 500 nm to 1,600 nm,
a first phase difference plate is inserted between said first and second polarizing plates, and
said first phase difference plate is a uniaxial phase difference plate which has a negative refractive index anisotropy that, when a refractive index in a slow axis direction showing a maximum refractive index in a plane is indicated as $n_x$, a refractive index in a fast axis direction perpendicular to the slow axis direction in a plane is indicated as $n_y$, and a refractive index in a thickness direction is indicated as $n_z$, shows $n_x = n_y > n_z$,
a phase difference value in the thickness direction that, when a thickness is indicated as d1, is given by $|(n_x+n_y)/2 - n_z| \cdot d1$ being set in a range of from 220 nm to 1,320 nm,
said first phase difference plate having an optical axis perpendicular to said first and second glass substrates.

2. A vertically aligned liquid crystal display device according to claim 1, wherein
a second phase difference plate is additionally inserted between said first and second polarizing plates, and
said second phase difference plate is a uniaxial phase difference plate which has a positive refractive index anisotropy that shows $n_x > n_y = n_z$,
a phase difference value in a plane that, when a thickness is indicated as d2, is given by $|(n_x - n_y)| \cdot d2$ being set in a range of from 1 nm to 100 nm,
said second phase difference plate having an optical axis parallel to said first and second glass substrates.

3. A vertically aligned liquid crystal display device according to claim 2, wherein,
in place of said first and second phase difference plates, a third phase difference plate is inserted between said first and second polarizing plates, and
said third phase difference plate is a biaxial phase difference plate which has a refractive index anisotropy that shows $n_x > n_y > n_z$,
a phase difference value in a plane that, when a thickness is indicated as d3, is given by $|(n_x - n_y)| \cdot d3$ being set in a range of from 1 nm to 100 nm, a phase difference value in the thickness direction that is given by $|(n_x+n_y)/2 - n_z| \cdot d3$ being set in a range of from 220 nm to 1,320 nm,
said third phase difference plate having an in-plane slow axis parallel to said first and second glass substrates.

* * * * *